May 20, 1952  C. M. HARRIS  2,597,096
HITCH
Filed May 8, 1950

INVENTOR
CHARLES M. HARRIS
BY
ATTORNEYS

Patented May 20, 1952

2,597,096

UNITED STATES PATENT OFFICE 2,597,096

HITCH

Charles M. Harris, Holland, Mich.

Application May 8, 1950, Serial No. 160,656

3 Claims. (Cl. 280—33.15)

This invention relates to a hitch of novel, sturdy and particularly effective structure, which is primarily for use in making a detachable connection between a pulling implement, such as a truck, tractor or the like, and a vehicle which is to be pulled. The large and heavy vehicles which are drawn over the road by powerful trucks, are of considerable weight, and in addition the loads which they carry increase the weight which has to be drawn or pulled. The hitch which is between the pulling truck and the drawn trailer vehicle is subjected not only to the strains of pulling, but of repeated shock and jar with a tendency for the hitch to become damaged and fail, particularly in connection with the pin about which a moving engaging member of the hitch is mounted to rock, and which pin directly sustains the strains and shocks which occur and, therefore, fails in many instances by shearing of the pin.

With my invention, a very practical, exceptionally sturdy, economical and easily produced hitch is provided wherein substantially or approximately 50% of the strain and shocks to which such pivot pin has been previously subjected are taken by another pivot pin in the novel structure which I have invented, so that such likelihood or possibility of failure is largely if not entirely removed. The structure, moreover, which embodies my invention is produced very economically, requiring little machine work, the several parts of the hitch being readily assembled and connected together without necessity of expensive machining so that the cost of manufacture is held at the lowest possible figure.

An understanding of the invention may be had from the following description, taken in connection with the accompanying drawing, in which, Fig. 1 is a longitudinal vertical section through the hitch, substantially on the plane of line 1—1 of Fig. 3.

Like reference characters refer to like parts in the different figures of the drawing.

Figure 1:
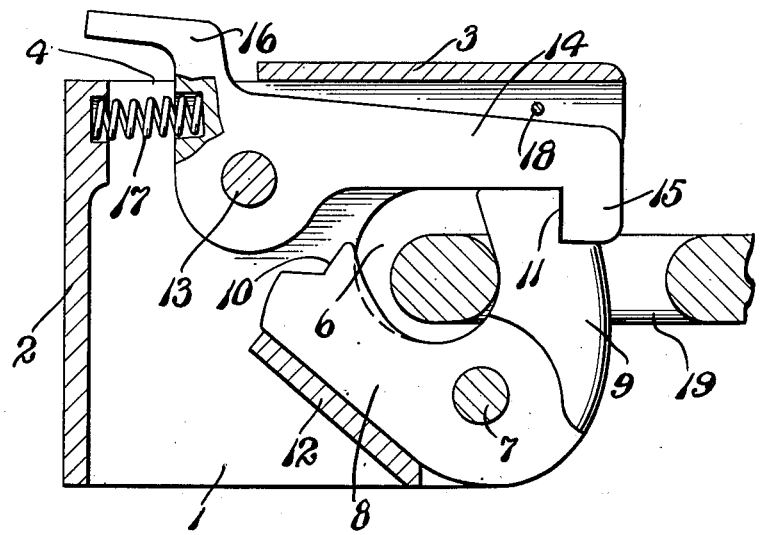
Figure 2:
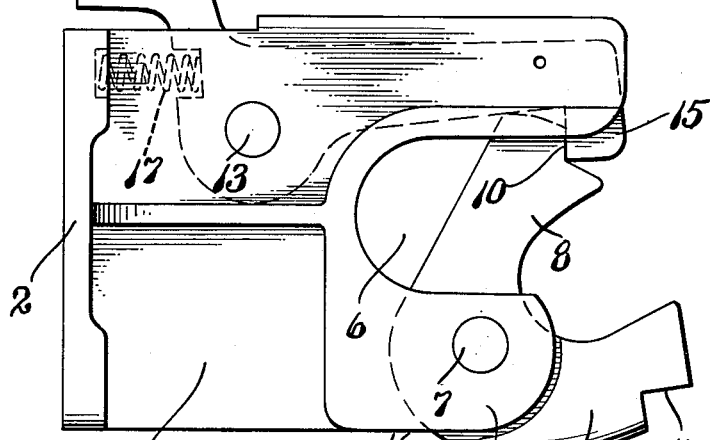
Fig. 2 is a side elevation of the hitch.
Figure 3:
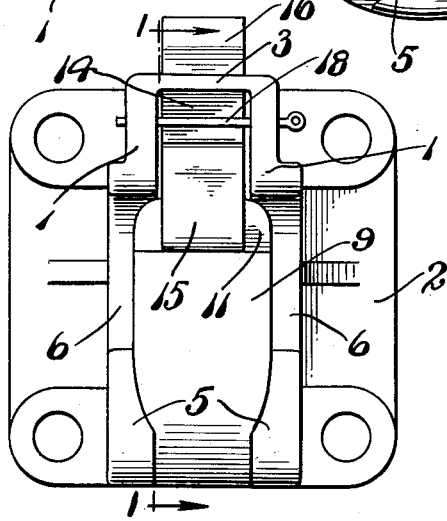
Fig. 3 is a rear elevation thereof.

In the construction shown, a body of cast metal is provided, having two spaced apart parallel vertical sides 1 integral with a vertical back 2, which is extended laterally to provide flanges for bolts to pass through for securing the hitch in place. A top 3 is integrally cast with the sides 1, at the rear portion thereof leaving an opening 4 between the back 2 and the adjacent edge of the top 3, as shown in Fig. 1. The sides 1 are strengthened and reinforced by reinforcing ribs as shown in Figs. 2 and 3, and at their lower rear portions are increased thickness as indicated at 5, below a horizontal slot 6 made one in each side, the two slots being disposed opposite each other. Such slots are open at their rear ends and extend partly toward the back plate 2 and are closed at their inner or forward end portions as shown in Fig. 2.

A pivot pin 7 extends through the thickened ear portions 5, on which a movable hitch member of generally U-shape form is mounted for rocking movement. The hitch member has two arms 8 and 9 as shown. Each of said arms is provided with a shoulder, the arm 8 with the shoulder 10 and the arm 9 with the shoulder 11 at a side and near the free end of each. An inclined partition 12, cast integral with the hitch body, is located between the sides 1 thereof against which the arm 8 of the movable hitch member may come when it is in operative position, as in Fig. 1.

A second pivot pin 13 is located toward the upper side of the body and inwardly from the slot 6, passing through the opposed sides 1, on which a lever 14 is pivotally mounted. The lever 14 lies generally horizontal extending outwardly from the pin 13 to the outer end of the hitch and terminating at such end in a down turned lug 15. At the opposite end of the lever and to the other side of the pin 13 it is extended upwardly through the opening 4, and terminates in a generally horizontal finger or thumb piece 16. A coiled compression spring 17 is located between said arm 16 and the adjacent back 2 of the body (Fig. 1) the normal tendency of the spring being to turn the lever in a clockwise direction.

With the parts in the position shown in Fig. 1, arm 9 of the rockably mounted hitch member extends vertically and its shoulder 11 comes against the inner side of the lug 15 of lever 14. With a clevis or ring 19 of conventional structure connected with the rocking hitch member in the usual manner, a detachable connection may be made between a tractor for example and a trailer following it. The spring 17 will normally hold the lever 14 in engagement with the arm 9. However, in practice it is thought desirable to pass a small rod or cotter pin 18 through openings in opposed sides 1 of the housing to lie above the outer end portion of the lever 14 and thereby prevent accidental or other undesired upward movement of the lever 14.

For disengaging or disconnecting the parts, the lever is pressed upon at its thumb piece 16 to lift the lug 15 above the arm 9 of the rocking hitch member, whereupon it may turn in a clockwise direction to the position shown in Fig. 2, bringing the shoulder 10 of the arm 8 against the lug 15, and holding the rearwardly extending portion of the lever 14 in an upper position as shown in Fig. 2, thereby causing a frictional bearing contact against the end of the arm 8 which serves to maintain the rocking hitch member in position such that by backing the tractor attached part of the hitch into engagement with the clevis or ring 19 there will be an automatic movement of the rocking hitch member from position in Fig. 2 to that in Fig. 1.

It is evident that pulling or shock forces met with in the use of the hitch, will be transmitted substantially equally to the two pins 7 and 13, each of said pins substantially withstanding one-half of such forces. Under such conditions the hitch is greatly increased in strength and sturdiness, particularly the pivot pin which carries the rocking hitch member and which, heretofore, has sustained substantially all of the forces of pulling and of shock is relieved, and the danger of shearing greatly reduced if not entirely removed.

The hitch structure described is economical to manufacture. It has a small number of parts, easily fabricated, and beyond the drilling or finishing of the holes through which the pins 7 and 13 pass and a drilling of the two small holes for the passage of the cotter pin 18, there is no other machine work required.

The invention is defined in the appended claims and is to be considered comprehensive of all forms of structure coming within their scope.

I claim:

1. In a hitch, a vertical back, two spaced vertical parallel sides integral with said back extending therefrom, a top integral with said sides at their upper edges extending from their outer ends toward but terminating short of the back, said sides at their outer ends and between their upper and lower edges having each a slot therein open at the outer end of each side and closed between said outer ends and the back, a hitch member of generally U-shaped form pivotally mounted on and located between the lower outer portions of said sides, the pivotal mounting being below the slots, said hitch member having two spaced legs adapted alternately to extend substantially across said slots, a generally horizontal latch bar located between said sides above said hitch member, means for pivotally mounting said latch bar on said sides at a point between the closed ends of said slots and said back, said latch bar extending outwardly from its pivot and terminating in a downwardly turned lug at its outer end, said legs of the hitch member each having a shoulder adapted to come against the inner side of said lug, said latch bar at its opposite end extending upwardly and through the space between the back and said top for ready access for manual operation, and a coiled compression spring between said back and said latch bar normally turning the outer end of said latch bar in a downward direction.

2. A structure as defined in claim 1, and a transverse member integral with said sides extending between them below and partially back of said closed ends of the slots in the sides, and located in a plane inclined to the vertical, against which one leg of said hitch member is adapted to be stopped when the other leg thereof is in engagement with said latch bar.

3. A hitch comprising, a body having a vertical back, spaced parallel vertical sides extending from said back, and spaced cross members integral with and connecting said sides, said sides at their ends away from the back having horizontal slots therein having closed ends between said back and the free ends of said sides, two horizontal pivot pins extending through and located between said sides, one below said slots and the other between the closed ends of the slots and said back, a hitch member of generally U-shaped form having two spaced legs mounted on the lower pin for pivotal movement, a generally horizontal latching bar pivotally mounted between its ends on the other pivot pin extending therefrom over the hitch member and having a downwardly extending lug at its outer end for engaging with and holding either leg of said hitch member at a fixed position, spring means normally turning the latching bar toward said hitch member, and means for manually moving said latching bar against said spring means to disengage the latching bar from the hitch member.

CHARLES M. HARRIS.

REFERENCES CITED

The following references are of record in the file of this patent:

UNITED STATES PATENTS

| Number | Name | Date |
| --- | --- | --- |
| 806,216 | Van Wye | Dec. 5, 1905 |
| 919,469 | Rude | Apr. 27, 1909 |

FOREIGN PATENTS

| Number | Country | Date |
| --- | --- | --- |
| 436,704 | Germany | Nov. 6, 1926 |
| 522,540 | France | Aug. 1, 1921 |